(12) United States Patent
Venrooij et al.

(10) Patent No.: US 7,771,184 B2
(45) Date of Patent: Aug. 10, 2010

(54) PRESS WITH PLATE-LIKE FRAME PARTS, AND METHOD FOR OPERATING SUCH A PLATE PRESS

(75) Inventors: Johannes Lambertus Gerardus Maria Venrooij, Duiven (NL); Adrianus Henricus Ignatius Maria Verkuijlen, Didam (NL)

(73) Assignee: Fico B.V., Duiven (NL)

( * ) Notice: Subject to any disclaimer, the term of this patent is extended or adjusted under 35 U.S.C. 154(b) by 101 days.

(21) Appl. No.: 11/919,130

(22) PCT Filed: Apr. 25, 2006

(86) PCT No.: PCT/NL2006/050100

§ 371 (c)(1),
(2), (4) Date: Mar. 20, 2008

(87) PCT Pub. No.: WO2007/001178

PCT Pub. Date: Jan. 4, 2007

(65) Prior Publication Data

US 2009/0045548 A1 Feb. 19, 2009

(30) Foreign Application Priority Data

Apr. 29, 2005 (NL) ............................. 1028904

(51) Int. Cl.
*B29C 45/08* (2006.01)
*B29C 45/12* (2006.01)
*B29C 45/23* (2006.01)

(52) U.S. Cl. .............. 425/233; 425/563; 425/567; 425/574; 425/577; 425/588; 425/410

(58) Field of Classification Search ......... 425/562–566, 425/161, 233, 234, 256, 344, 352, 355, 406, 425/408, 410, 468, 544, 567, 574, 577, 588
See application file for complete search history.

(56) References Cited

U.S. PATENT DOCUMENTS

| 4,140,238 A * | 2/1979 | Dawson ...................... 222/495 |
| 4,372,740 A | 2/1983 | Kuramochi et al. |
| 5,863,475 A | 1/1999 | Ueda |

(Continued)

FOREIGN PATENT DOCUMENTS

DE 10 2004 005 686 A1 8/2004

(Continued)

OTHER PUBLICATIONS

Machine Translation of Kraemer, Rudolf; EP 1284179A1,;Jun. 2002.*

*Primary Examiner*—Joseph S Del Sole
*Assistant Examiner*—Ryan Ochylski
(74) *Attorney, Agent, or Firm*—Nixon & Vanderhye P.C.

(57) ABSTRACT

The present invention relates to a press for encapsulating electronic components, comprising: two displaceable mold parts (5,6), feed means for encapsulating material, and a drive mechanism connecting onto the mold parts. In a first embodiment the drive mechanism is provided with a fluid bed (14) and a first fluid feed (15) whereby their connection can be interrupted by a displacer (16). In a further embodiment a displacer (28) is provided in the feed channel (26) to place the encapsulating material (25) under pressure. Furthermore, the present invention relates to methods for encapsulating electronic components with encapsulating material in such presses.

12 Claims, 4 Drawing Sheets

U.S. PATENT DOCUMENTS

| | | | |
|---|---|---|---|
| 6,848,174 B2 * | 2/2005 | Venrooij et al. | 29/841 |
| 2002/0006076 A1 * | 1/2002 | Koide et al. | 366/78 |

FOREIGN PATENT DOCUMENTS

| | | | |
|---|---|---|---|
| EP | 1 284 179 A1 | 2/2003 | |
| JP | 64-077510 | 3/1989 | |
| JP | 11274197 A * | 10/1999 | |
| WO | 97/35701 | 10/1997 | |

* cited by examiner

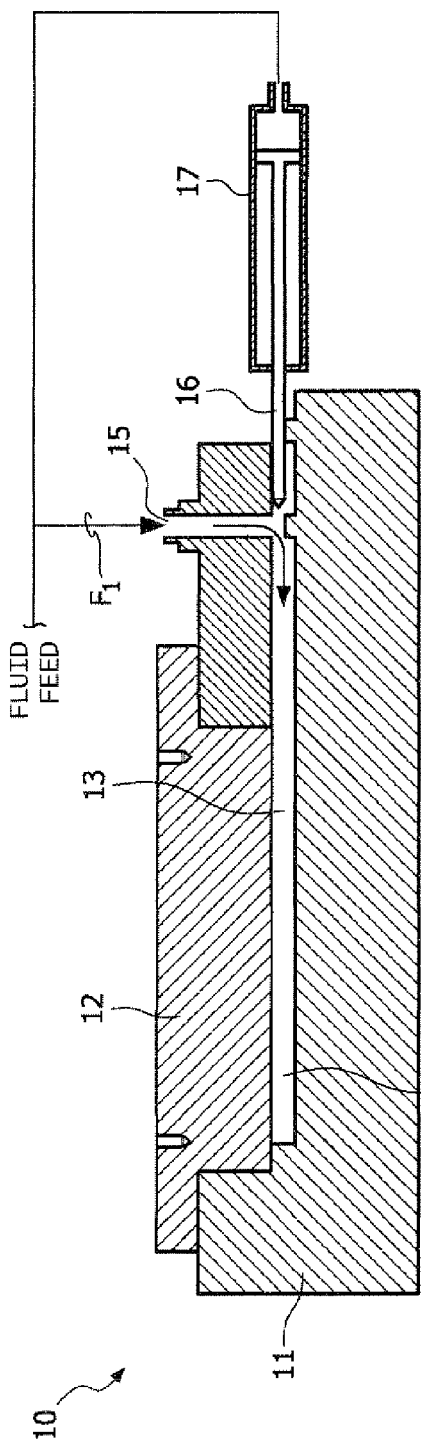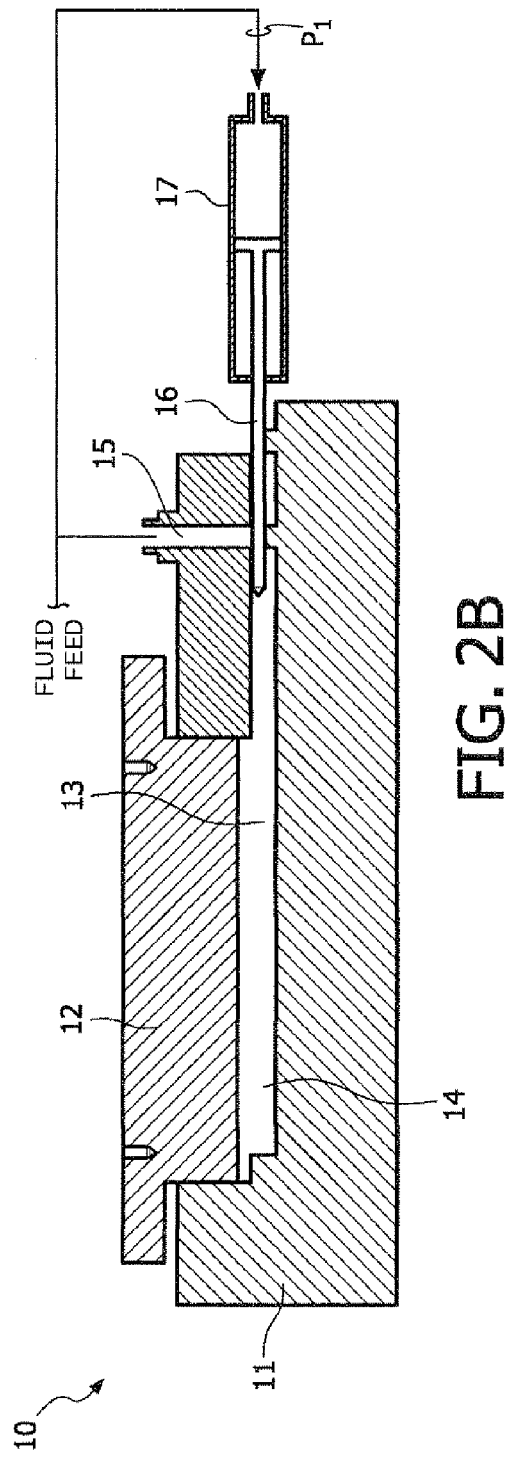
FIG. 2A
FIG. 2B

PRESS WITH PLATE-LIKE FRAME PARTS, AND METHOD FOR OPERATING SUCH A PLATE PRESS

This application is the US national phase of international application PCT/NL2006/050100 filed 25 Apr. 2006 which designated the U.S. and claims benefit of NL 1028904, dated 29 Apr. 2005, the entire content of which is hereby incorporated by reference.

FIELD

The present invention relates to a press for encapsulating electronic components with encapsulating material. The present invention also relates to a method for encapsulating electronic components with encapsulating material in such a press.

BACKGROUND AND SUMMARY

In the encapsulating of electronic components mounted on a carrier, and more particularly in the encapsulating of semiconductor circuits (chips), use is generally made according to the prior art of encapsulating presses provided with two mould parts, into at least one of which are recessed mould cavities. After placing the carrier with the electronic components for encapsulating between the mould parts, the mould parts are moved toward each other such that they clamp the carrier. Encapsulating material is then supplied to the mould cavities and, after at least partial curing of the encapsulating material, the carrier with encapsulated electronic components is taken out of the encapsulating press. To limit the processing cycle of an encapsulating press it is desirable to move the mould parts toward each other rapidly and to reduce the speed only shortly before engaging on the products for encapsulating. A press is thus obtained which operates quickly but is also provided with soft close and therefore reduces the risk of damage to the products for processing. For this purpose various constructions have been developed in the past, such as for instance EP 0 935 520 in the name of the present applicant. Although a drive as described in this European patent provides the desired functionality it has the drawback that the drive is voluminous and heavy. This leads to a relatively expensive press which also takes up a considerable amount of space during use.

EP 1 284 179 discloses an apparatus for enhancing the closing force of an injection mould, more specifically for the production of shoes and soles. The mould is provided of two opposite mould parts displaceable relative to each other, feed means for moulding material and a drive mechanism for relative displacement of the mould parts. The drive mechanism consists of a cylinder with a first cylinder space fed by a feed line and a second cylinder space. By the movement of a piston in the second cylinder space a protruding part of a cylinder rod that is connected with the piston can be moved into the feed line of the first cylinder space to close the feed line off. This further movement of the protruding part of the cylinder rod pushes away the fluid in the first cylinder space. Due to the design of the double cylinder this results in enhancement of the closing force of the mould.

Object of the present invention is to provide a press of the type mentioned in the preamble which can be embodied in simpler, compact and light manner while it can still be closed at different speeds in a secure manner.

To this end the invention provides a press for encapsulating electronic components with encapsulating material according claim 1. A fluid bed is understood to mean a piston-like construction; a container open on one side and filled with a fluid which is covered by a replaceable wall part. Such a device has the advantage that for the rapid mutual displacement of the mould parts (the so-called "high speed movement") an effective fluid drive requiring relatively little pressure can be used. Such a drive can take a very compact form and components are commercially available as inexpensive standard trade items. Another advantage of a fluid bed is that it can be assembled very compactly with a displaceable mould part. The displaceable mould part can connect directly onto the fluid bed, but in practice it is desirable for the exchangeability of mould parts that the fluid bed is covered by a displaceable wall part adapted for releasable coupling of a mould part. The drawback of a normal drive making use of a fluid bed for the high speed movement is however that it cannot be combined in a simple and reliable manner with a separate drive facility for the (slower) closing movement of the mould parts which moreover usually requires a greater pressure to be able to provide the desired closing pressure. The present invention now enables combining the advantages of the use of a fluid bed with the advantages of a press that can be operated at different speeds for different parts of the path of movement and has a drive which provides the required higher pressure only where this is necessary (when actually closing the press). Use is herein made of a displacer operable independently of the first fluid feed. In addition to the desired functionality of a different transmission ratio to facilitate the soft close of the mould parts with greater pressure the displacer also guarantees in inventive manner that when the displacer is activated the action of the high speed movement (first fluid feed to the fluid bed) is forcibly blocked. This means that the press has a forced process protection. The displacer is embodied such that it is operable by a cylinder onto which a second fluid feed connects such that the fluid bed and the cylinder are fed by a common fluid feed. This implies that the first fluid feed and second fluid feed are combined in a single and thus common fluid feed providing a very simple and efficient construction that is not only simpler to produce but also limits the chances for defects and limits the maintenance demands in relation to the closest prior art.

In a preferred embodiment variant the press also comprises a frame, which frame is provided with at least two plate-like frame parts placed substantially vertically adjacent to the displaceable mould parts. Such a construction of the press with plate-like frame parts situated on opposite sides of the mould parts, also designated as "plate press", increases the possibilities for a compact construction of the press still further. Furthermore, the press can thus be manufactured in a relatively light and yet very stable manner. Another advantage is that a press with plate-like frame parts can be manufactured simply and thus relatively inexpensively.

In yet another embodiment variant the press is provided with a plurality of mutually adjacent displaceable mould parts, wherein for instance a separate fluid bed connects onto each of the mutually adjacent displaceable mould parts. By means of such a multiple press several products can be processed simultaneously (multi-strip) allowing for the press to compensate possible differences in height between the products for simultaneous processing. The capacity of the press can also be expanded in this manner without very heavy and large drive means being required. This again contributes to the possibility to embody the press compactly (even when it has a greater processing capacity).

It is desirable that the transmission ratio of the first fluid feed to the fluid bed is smaller than the transmission ratio of the cylinder to the fluid bed. In this manner the desired higher pressure level when closing the press can be easily achieved.

The cylinder can be embodied as desired and depending on the circumstances as a pneumatic cylinder (air cylinder) or a hydraulic cylinder. When processing sensitive products such as semiconductors a pneumatic drive is generally preferred because this reduces the risk of contamination of the products.

In a specific embodiment variant the fluid bed is filled with solid particles. Alternatively it is of course also possible to fill the fluid bed with a liquid (such as for instance a liquid which is used in hydraulic systems). The advantage of solid particles is that the risk of leakage and therefore contaminations of the fluid bed is reduced.

In yet another embodiment variant the displaceable mould part forms part of the fluid bed. This means that the displaceable mould part also forms the displaceable part (the piston) of the fluid bed or is at least integrally formed with the displaceable cylinder part of the fluid bed. The displacer can likewise be embodied movable parallel to the contact surface of the displaceable mould part.

The displacer is preferably movable on the side of the displaceable mould part remote from the contact side and can furthermore be embodied such that it is displaceable parallel to the contact surfaces. This means that the displacer directly compresses the fluid bed. The pressure exerted by the displacer will thus be transmitted uniformly to the displaceable mould part. The construction height of the press can thus be kept particularly limited. The displacer can be embodied such that it can be forced completely into the fluid bed such that it is then situated under the displaceable mould part. The cylinder can also be situated under the displaceable mould part bat it is easier to allow it to protrude from the rear side (or front) of the press, since this space is available under normal operating conditions and in this manner the components of the press remain very easily accessible, for instance for check-up and maintenance.

The invention also provides a press for encapsulating electronic components with encapsulating material, comprising: two opposite mould parts displaceable relative to each other, feed means for encapsulating material, and a drive mechanism connecting onto at least one of the mould parts for mutual displacement of the mould parts, with the feature that at least one of the mould parts is provided with a displacer whereby the encapsulating material fed between the mould parts by the feed means can be placed under an increased pressure. Such a press also has the advantage that a feed of encapsulating material at relatively low filling pressure can be combined with a separately acting mechanism supplying the actual final filling pressure. The displacer can be embodied very compactly since placing a liquid encapsulating material under final filling pressure only requires very little compression. The displacer can thus be easily integrated in one of the mould parts.

In a preferred embodiment the displacer is formed by a displaceable pin integrated in a mould part and the displacer further preferably connects onto drive means for displacing the displacer. Such a displacer can be realized in a structurally very simple manner and at relatively very limited costs.

The displacer can moreover be embodied such that it is also adapted for releasing an encapsulated electronic component from the mould. Such a displacer is thereby directly provided with the functionality of a pusher pin or ejector pin. Reversely a known ejector pin (including the drive of such an ejector pin) can also be employed as displacer according to the present invention provided the actuation of the drive is adapted for this purpose. The drive mechanism of one or more ejector pins can thus also be used as drive of one or more displacers.

In yet a further embodiment variant it is possible that the displacer connects onto a passage for encapsulating material arranged in the mould parts. It is of course necessary that the displacer engages directly on (respectively acts on) the fed encapsulating material. When activating the displacer (this means that the displacer is moved into the encapsulating material) the connection between the feed means and the mould cavity determined by at least one of the mould parts around an electronic component for encapsulating can in this manner be impeded which makes flow-back of the encapsulating material from the mould cavity to the feed means impossible. In this manner it is also possible to realize that only the encapsulating material in the mould cavity is placed under an increased pressure. There is therefore no need to embody the feed means such that they can also withstand the higher final pressure required in the mould cavity. This for instance has the advantage that the contamination of the feed means becomes better controllable (such as leakage of encapsulating material between a plunger and an associated plunger housing).

The present invention also provides a method for encapsulating electronic components with encapsulating material in a press according to any of the foregoing claims, comprising the processing steps: A) placing an electronic component for encapsulating on a mould part, B) moving the two opposite mould parts toward each other at relatively great speed, C) after processing step B) making the opposite mould parts connect onto each other at a lesser speed such that the electronic component for encapsulating is enclosed, between the mould parts, and D) feeding the encapsulating material to the electronic component, wherein the processing steps B) and C) are forcibly mutually separated in that during processing step C) a safeguard prevents that processing step B) also takes place simultaneously. For the advantages of applying this method reference is made to the advantages as discussed above with reference to the device according to the invention.

In addition, the invention also provides a method for encapsulating electronic components with encapsulating material in a press with displacer, comprising the processing steps: P) placing an electronic component for encapsulating on a mould part, L) moving the two opposite mould parts toward each other such that the electronic component for encapsulating is enclosed between the mould parts, M) feeding liquid encapsulating material to the electronic component under a determined pressure, and N) placing the liquid encapsulating material fed to the electronic component according to the processing step M) under an increased pressure by means of the displacer. By means of this method the advantages can be realized as elucidated above with reference to the press with displacer according to the present invention.

BRIEF DESCRIPTION OF THE DRAWINGS

The present invention will be further elucidated on the basis of the non-limitative exemplary embodiments shown in the following figures, in which:

FIGS. 2A and 2B show cross-sections through an operating mechanism of a press with a fluid bed drive which engages on a lower mould part of a press respectively in a situation for a high speed movement and a situation for placing the encapsulating material under operating pressure.

DETAILED DESCRIPTION

Figure 1A:
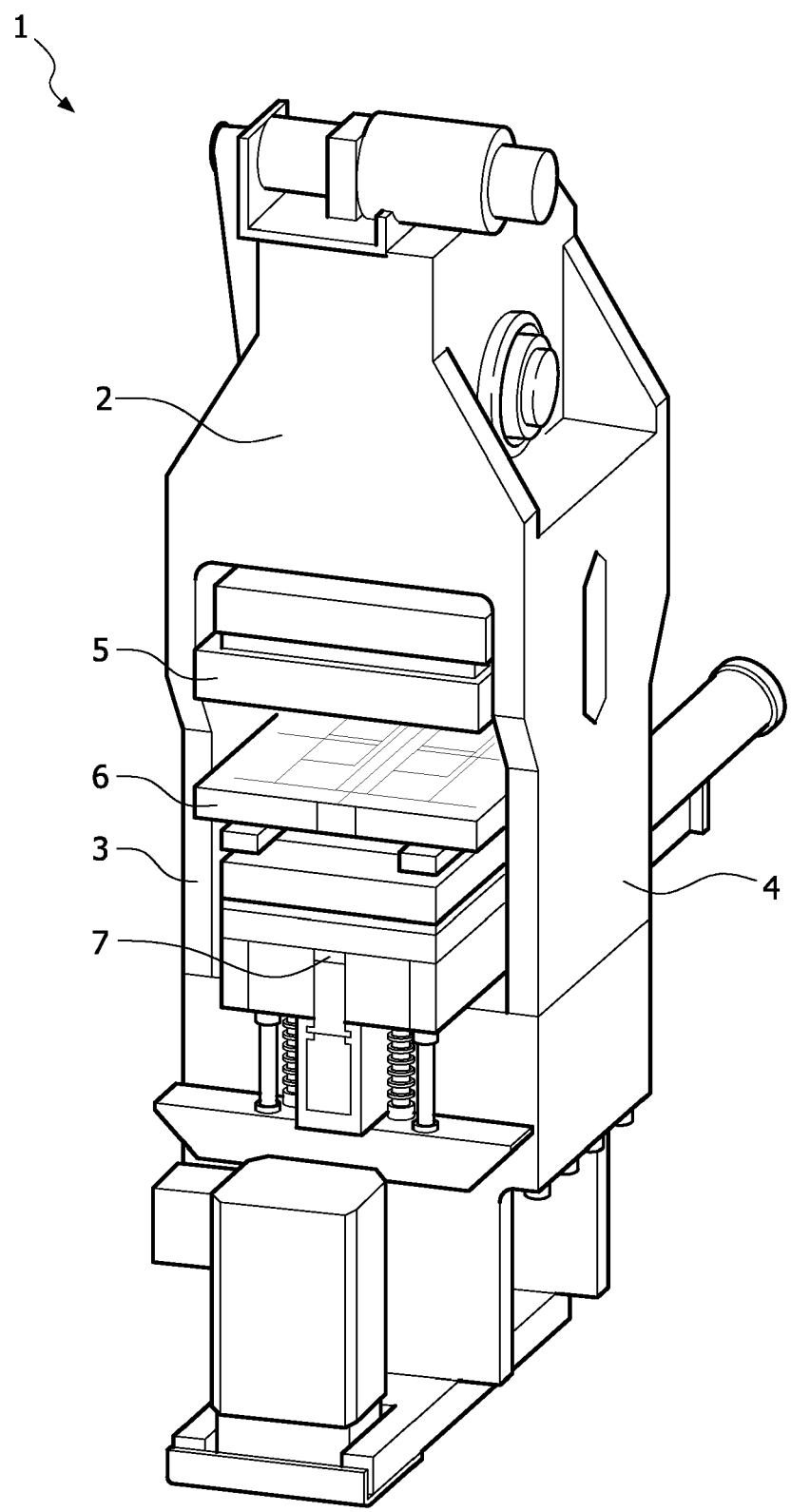
FIGS. 1A and 1B show perspective views of a plate press according to the present invention.
Figure 1B:
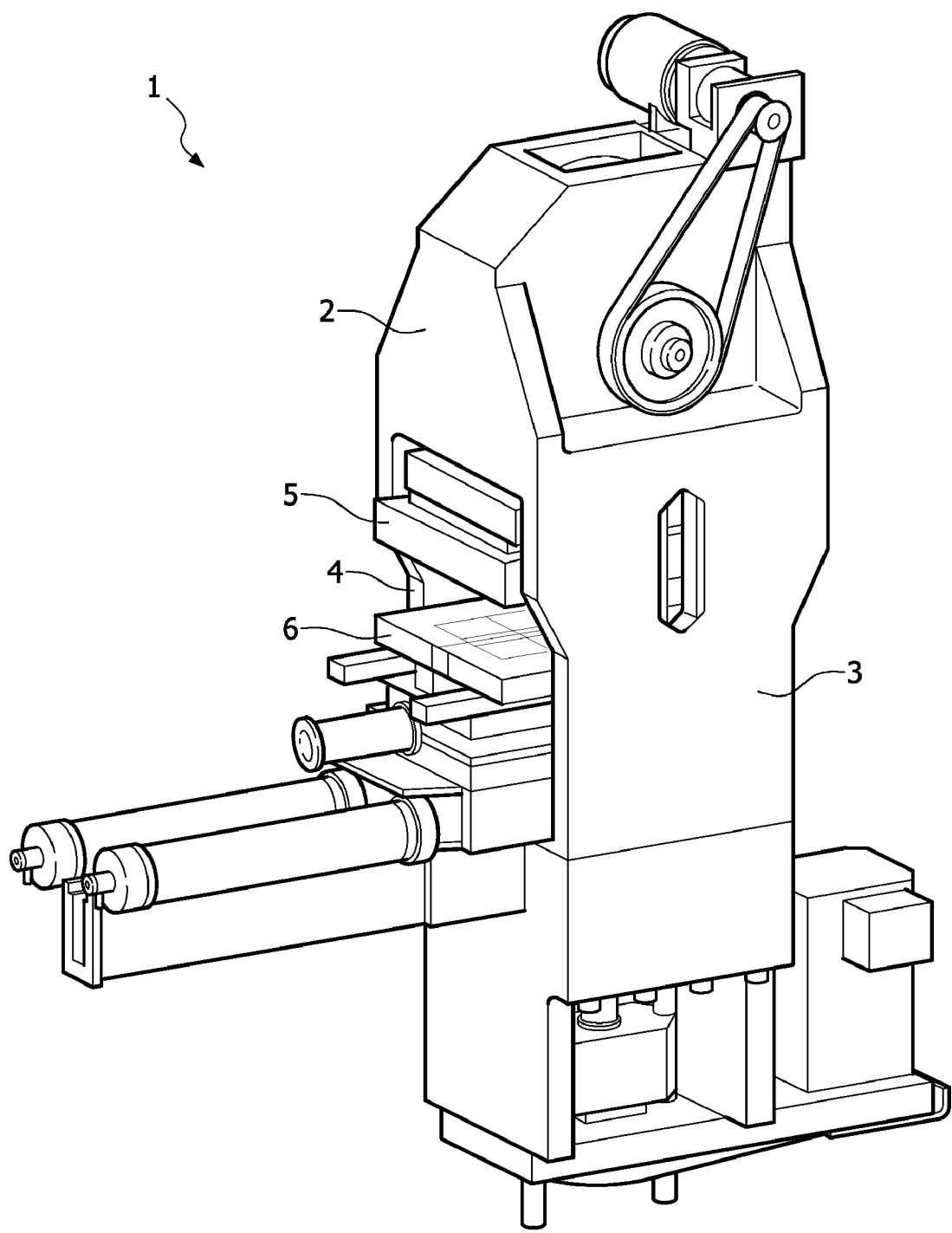

FIGS. 1A and 1B show two views of the same plate press 1 according to the present invention with a frame 2 having two plate-like frame parts 3, 4 between which two mutually displaceable mould parts 5, 6 are situated. Situated under the lower mould part is a mechanism 7, not further specified, whereby plungers in the lower mould part 6 can be displaced such that encapsulating material can be displaced with the plungers. For a further elucidation of the operation of the plate press 1 reference is made to the figures below.

FIG. 2A shows a cross-section through an operating mechanism 10 according to the invention which connects onto a lower mould part of a press. Herein a fluid 13 containing space 14 is present between a base part 11 and an operating part 12 displaceable relative to the base part 11. When moving the operating part 12 at relatively great speed relative to the base part 11 a fluid is brought into the space 14 via a fluid feed 15 according to arrow F1 respectively removed from the space 14 in opposite direction. This fluid can optionally be introduced with interposing of a fluid container (fluid buffer) out of which fluid can be pressed into the fluid feed 15 by means of gas pressure (for instance compressed air). This enables driving of the high speed movement in a very simple manner with for instance compressed air. To prevent unwanted interaction between the gas and the fluid a flexible membrane can be placed between the fluid and the gas allowing displacement of fluid without direct contact between the fluid and the gas. As soon as a mould half, connected to the displaceable operating part 12 and not shown in this figure, connects onto an opposite mould half (or almost connects onto the opposite mould half) a displacer 16 can be activated by means of an operating cylinder 17.

FIG. 2B shows the situation of the operating mechanism 10 in which the displacer 16 is displaced relative to FIG. 2A such that the fluid feed 15 is now separated from the fluid 13 containing space 14. By pressing the displacer 16 into the fluid 13 the pressure in the space 14 will increase with the result that the pressure exerted by the displaceable body 12 will also increase (of course provided that it encounters resistance for instance because mould parts (not shown) connect onto each other). For displacing the displacer 17 an operating pressure P1 will have to be applied on the cylinder 17.

Figure 3A:
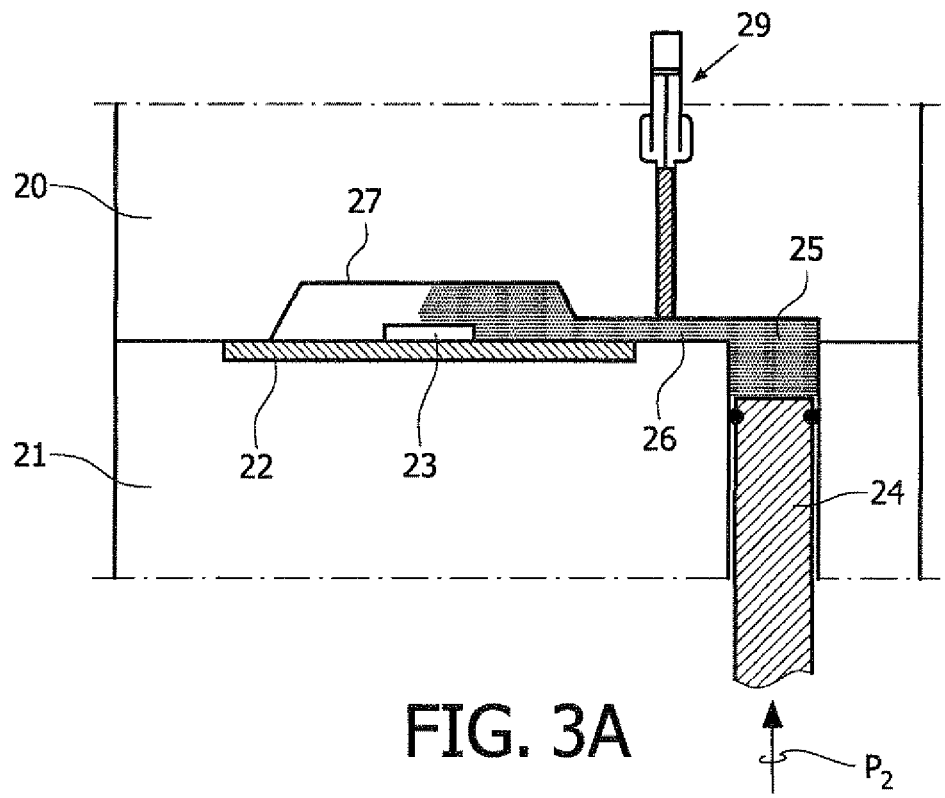
FIGS. 3A and 3B show cross-sections through a part of a press with a displacer respectively in a situation during feeding of encapsulating material to a mould part and a situation in which the encapsulating material arranged in the mould part is placed under increased pressure.

FIG. 3A shows a cross-section through two mutually connecting mould parts 20, 21 wherein a carrier 22 with an electronic component 23 mounted thereon is clamped between these mould parts 20, 21. By means of displacement according to arrow P2 of a plunger 24 displaceably accommodated in the lower mould part liquid encapsulating material 25 is pressed through a feed channel 26 (also designated as runner 26) to a mould cavity 27 recessed in the upper mould part 20. This manner of encapsulating electronic components 23 is also designated as transfer moulding.

Figure 3B:
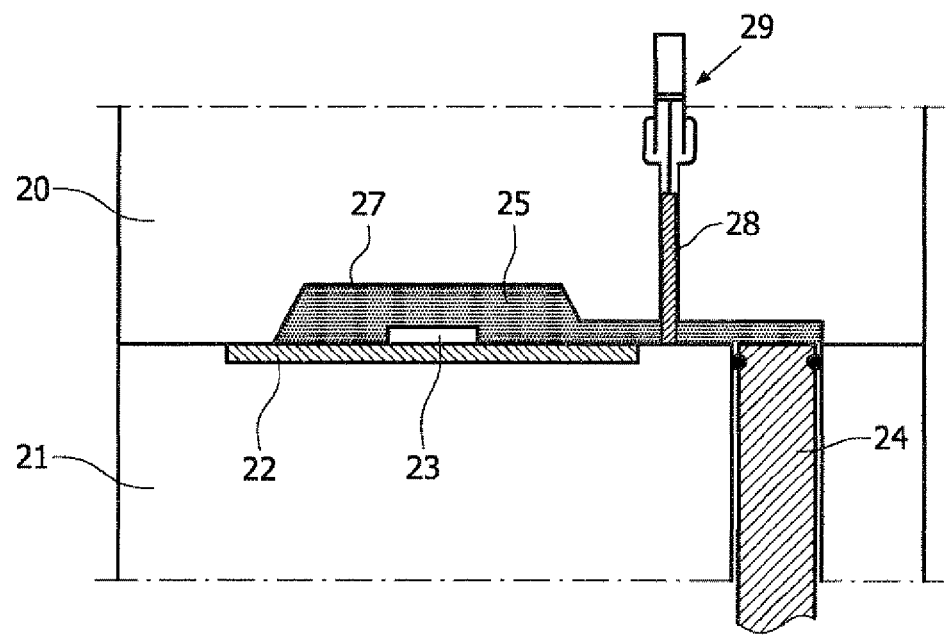

After the mould cavity 27 is completely filled with encapsulating material 25, as is shown in FIG. 3B, a displacer 28 can be pressed into the encapsulating material 25. In this case the displacer 28 is situated at a position in the feed channel 26 but the displacer can be arranged as desired at a different location in the upper or lower mould part 20 respectively 21. For displacing the displacer 28 it is operable by a drive 29, in this case an operating cylinder.

The invention claimed is:

1. A press for encapsulating electronic components with an encapsulating material, comprising:

opposed first and second mould parts, wherein at least the first mould part is displaceable relative to the second mould part between closed and open conditions, and wherein the first and second mould parts define a mold cavity when in the closed condition thereof for containing an electronic component to be encapsulated, feed means for feeding the encapsulating material to mold cavity defined by the first and second mould parts, and a drive mechanism operatively connected to at least the first mould part, wherein the drive mechanism includes, (i) a fluid bed having a fixed base part, a moveable operating part connected to the first mould part, a fluid-containing space defined between the fixed base part and the moveable operating part, and a first fluid feed which is fluid-connected to the fluid-containing space; and (ii) a fluid-activated cylinder having a second fluid feed;

(iii) a displacer operatively connected to the cylinder and positioned with respect to the fluid-containing space and the first fluid feed so as to be moveably displaceable upon operation of the cylinder between a first position wherein the first fluid feed is in fluid-communication with the fluid-containing space to allow a fluid from a fluid source to be introduced into the fluid-containing space, and a second condition wherein the displacer extends into the fluid-containing space so as to disconnect fluid communication between the first fluid feed and the fluid-containing space and to increase pressure of the fluid in the fluid-containing space when the first and second mould parts are in the closed condition thereof, and (iv) a common fluid feed source operatively connected to both the first fluid feed of the fluid bed and second fluid feed of the cylinder.

2. A press as claimed in claim 1, which further comprises a frame provided with at least two plate-like frame parts placed substantially vertically adjacent to the first and second mould parts.

3. A press as claimed in claim 1, which comprises a plurality of mutually adjacent first and second mould parts.

4. A press as claimed in claim 3, wherein the drive mechanism includes a plurality of fluid beds, and wherein each of the mutually adjacent displaceable mould parts includes a separate one of the fluid beds.

5. A press as claimed in claim 1, wherein the fluid bed and the cylinder have respective transmission ratio, and wherein the transmission ratio of the fluid bed is smaller than the transmission ratio of the cylinder.

6. A press as claimed in claim 1, wherein the cylinder is a pneumatic cylinder.

7. A press was claimed in claim 1, wherein the first and second mould parts define respective contact surfaces, and wherein the fluid bed is disposed parallel to the contact surfaces of the first and second mould parts.

8. A press as claimed in claim 7, wherein the displacer is moveably displaceable parallel to the contact surfaces of mould parts.

9. A press as claimed in claim 1, wherein the displaceable first mould part forms part of the fluid bed.

10. A press as claimed in claim 9, wherein the first and second mould parts define respective contact surfaces, and wherein the displacer is moveably displaceable parallel to the contact surfaces of the first and second mould parts.

11. A press as claimed in claim 10, wherein the displacer is moveably displaceable on a side of the first and second mould parts that is remote from the contact surfaces thereof.

12. Method for encapsulating electronic components with encapsulating material in a press according to claim 1, wherein the method comprises the processing steps of:

A) placing an electronic component for encapsulating on one of the opposite mould parts;

B) moving the two opposite mould parts each other at a first speed,

C) after processing step B) making the opposite mould parts connect onto each other at a second speed which is less than the first speed such that the electronic component for encapsulating is enclosed between the mould parts; and D) feeding the encapsulating material to the electronic component, wherein the processing steps B) and C) are forcibly mutually separated in that during processing step C) a safeguard prevents that processing step B) also takes place simultaneously.

* * * * *